United States Patent [19]

Büdenbender

[11] Patent Number: 4,945,202
[45] Date of Patent: Jul. 31, 1990

[54] METHOD OF AND APPARATUS FOR THE WELDING OF THIN SHEET METAL WORKPIECES

[76] Inventor: Bernd Büdenbender, Schubertweg 5, 2160 Stade, Fed. Rep. of Germany

[21] Appl. No.: 300,459

[22] Filed: Jan. 19, 1989

[30] Foreign Application Priority Data

Jan. 19, 1988 [DE] Fed. Rep. of Germany ....... 3801365

[51] Int. Cl.⁵ .............................................. B23K 26/00
[52] U.S. Cl. ............................. 219/121.63; 219/121.64
[58] Field of Search ...................... 219/121.63, 121.64, 219/159

[56] References Cited

U.S. PATENT DOCUMENTS 4,650,954  3/1987  Frings et al. ............... 219/121.84 X
4,769,522  9/1988  Lentz et al. ................ 219/121.64 X Primary Examiner—C. L. Albritton
Attorney, Agent, or Firm—Herbert Dubno

[57] ABSTRACT

Thin sheet metal workpieces are overlapped and a laser beam trained on the overlapping regions to heat them to a fusion temperature. The fusion seam is compressed to a maximum of 1.6 times the thickness of the sheet metal workpieces to provide a tight reliable fatigue-resistant seam of a thickness less than twice the sheet metal thickness.

16 Claims, 3 Drawing Sheets

METHOD OF AND APPARATUS FOR THE WELDING OF THIN SHEET METAL WORKPIECES

FIELD OF THE INVENTION

My present invention relates to a method of and to an apparatus for the welding of thin sheet metal workpieces and, more particularly, to the welding of such workpieces utilizing a laser beam as the heating source.

BACKGROUND OF THE INVENTION

Thin sheet metal workpieces which can range in thickness from the thickness of a foil (submillimeter thickness) to a thickness of several millimeters, have been welded heretofore by superimposing the edge strip of one of the sheet metal workpieces on an edge strip of another or by butting the edges of the workpieces together utilizing as a heating means a laser beam (see, for example German patent No. 733 200, German open application No. 36 00 532, "Laser in Elektrotechnologie und Materialbearbeitung", 1982, Akad. Verl. -Gesellschaft Geest und Portig KG, Pages 128, 148 to 155).

In the first case, there is a local doubling of the thickness of the sheet metal welded together which is undesirable to say the least and frequently is intolerable.

In the butt welding of such edges (see German open application No. 37 13 527) the edge regions which are to be joined require machining and treatment in an expensive and time-consuming manner to allow a reliable, dense, tight and secure weld seam to be obtained.

OBJECTS OF THE INVENTION

It is the principal object of the present invention to provide a method of welding thin sheet metal workpieces together to form an edge seam whereby drawbacks of the type described can be avoided.

A more specific object of this invention is to provide a welding method which will reliably join two thin sheet metal workpieces in a reliable and tight joint, utilizing laser beam heating but without the doubling of the thickness of the joint which characterizes earlier systems.

Yet another object of my invention is to provide an improved apparatus for carrying out the latter method.

SUMMARY OF THE INVENTION

These objects are attained, in accordance with the present invention, by a method of welding edge portions of thin sheet metal together, the method comprising the steps of:

(a) overlapping the edge portions of the thin sheet metal to form an overlap region of the thin sheet metal;

(b) training a laser beam on the overlap region for a period and of an intensity sufficient to heat and raise the temperature locally of the edge portions to a temperature above the melting point of the sheet metal; and (c) pressing the heated edge portions together between tools having a spacing less than the sum of the thicknesses of the edge portions to form a seam between the edge portions of a thickness which is substantially less than the sum.

Advantageously, the apparatus for this purpose comprises:

means including a pair of tools receiving overlapping edge portions of the thin sheet metal forming an overlap region between them and having a spacing less than the sum of the thicknesses of the edge portions; and means for training a laser beam on the overlap region for a period and of an intensity sufficient to heat and raise the temperature locally of the edge portions to a temperature above the melting point of the sheet metal whereby the heated edge portions are pressed together to form a seam between the edge portions of a thickness which is substantially less than the sum.

According to a feature of the invention, a location at which the region is locally heated by the laser beam is progressively advanced along the edge regions and the tools which compress the edge region directly follow the progressive advance of this location therealong. The pressing tools are preferably pressing rolls engaging the edge regions from opposite sides with the edge region being advanced between the rolls from an upstream side to a downstream side thereof.

The edge regions can be overlapped in the initial step of the method by placing an upper one of the edge regions above the lower one of the edge regions with the laser beam being trained on the upper one of the edge regions.

The rolls can be cantilevered to overhang the regions of overlap at free ends of the rolls.

The rolls can include a base roll of a larger diameter below the overlap region and a pressure roll of smaller diameter located above the overlap region, while means is provided for training the laser beam on an upper one of the edge portions directly upstream to the smaller diameter roller. The overlap region can have a width which is substantially 0.3 to eight times (preferably 0.5 to 1.5 times) the thickness of the sheet metal and the thickness of the overlap region can be pressed to a joint thickness of at most 1.6 (preferably 1.3) times the thickness of the sheet metal.

The rolls can be composed of at least centrally tubular zones of a material of high thermal conductivity selected from the group which consists of copper and aluminum although centrally tubular zones of low thermal conductivity composed of sintered or pressed glass, mineral wool, silica or ceramic may be used.

The coolant may be directed onto or through one or both of the rolls and means may be provided for maintaining a predetermined temperature of at least one of the rolls by contacting same with a thermal medium at a predetermined temperature.

According to the invention, therefore, a joint seam having a thickness of at most 1.6 times the sheet metal thickness and preferably below 1.3 times the sheet metal thickness, most preferably equal to the sheet metal thickness, can be formed.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
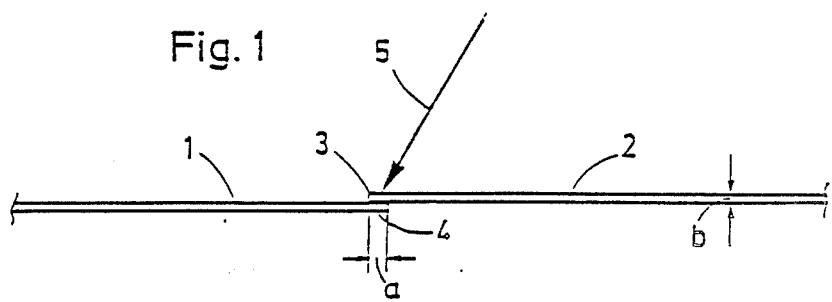
FIG. 1 is a front elevational view showing two overlapping thin sheet metal workpieces and the laser beam trained thereon.

FIG. 1 shows two thin sheet metal workpieces 1 and 2 which are overlapped at respective edge regions 3 and 4 by a distance a. The welding is effected by heating at least the upper edge region with a laser beam 5 trained thereon and by moving the edge seam in the longitudinal direction thereof past the laser beam. The laser beam generator has been illustrated at 6 in FIG. 2.

Directly following the heating of a local region of the overlap, the welding seam 7 is formed from the hot fusable and flowable metal by subjecting to a pressing operation to squeeze the two edge regions together (see FIG. 3) and thereby reduce the thickness of the weld seam while increasing the bond between the workpieces.

In general, the reduction of the thickness should yield a joint thickness which is equal to the thickness b of the sheet metal workpieces 1 and 2. However, a reduced reduction can be tolerated in many cases to, for example, 1.6b or, more preferably, at most 1.3b.

The overlap region a should be held relatively small and can be between 0.3b and 8b, preferably between 0.5b and 1.5b.

As the width of the overlap region is reduced, the ease of compressing the heated joint to a reduced thickness increases. However, an excessively narrow overlap may not be able to compensate for deviations in the accuracy of the edge line of the workpieces.

The larger overlap region allows the edge tolerances to be larger but requires more material to be squeezed out in the pressing operation and poses the danger of temperature drop between the laser heating and pressing.

The pressing operation is effected between cantilevered rolls 8 and 9 in the nip between such rolls. The workpieces are moved in the direction of arrows 1? through the nip. It is also possible to pass the workpiece between the jaws of a hammer machine to effect the squeezing operation.

Figure 2:
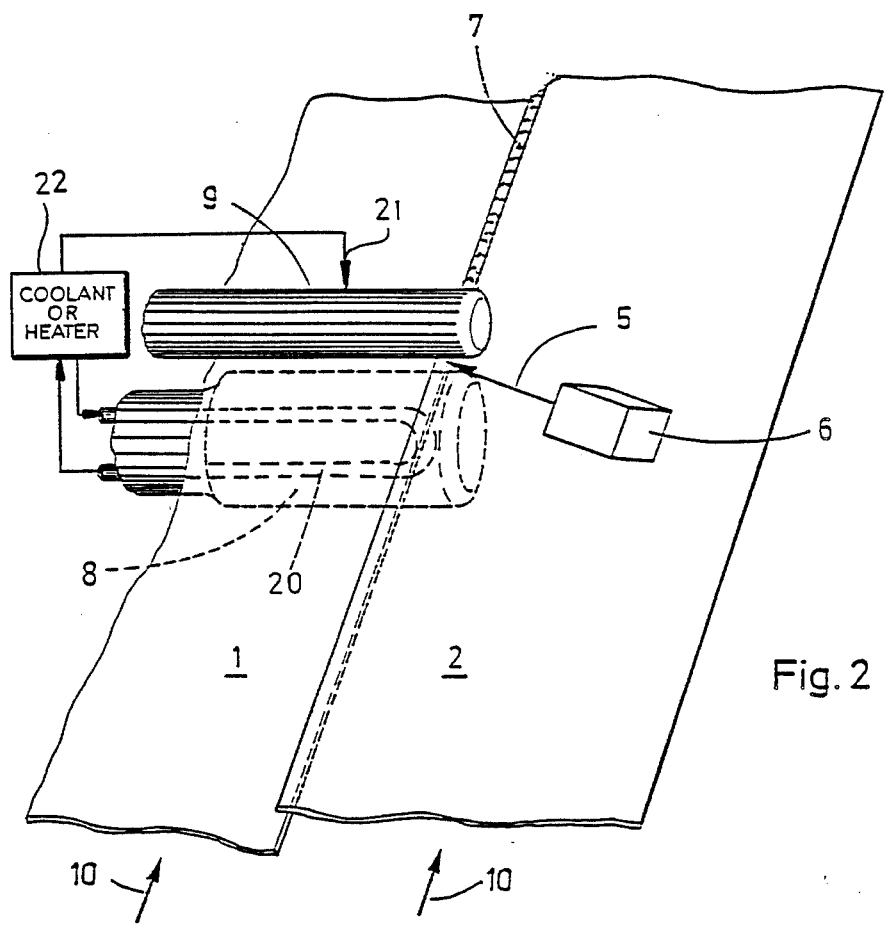
FIG. 2 is a perspective view of two slightly overlapping sheet metal workpieces showing their overlapping region with the laser beam trained thereon and the compression effected by the rolls.

Laser beam 5 of the laser generator 6 is trained on the overlapping region 3, 4 directly upstream of the rolls (FIG. 2).

Figure 3:
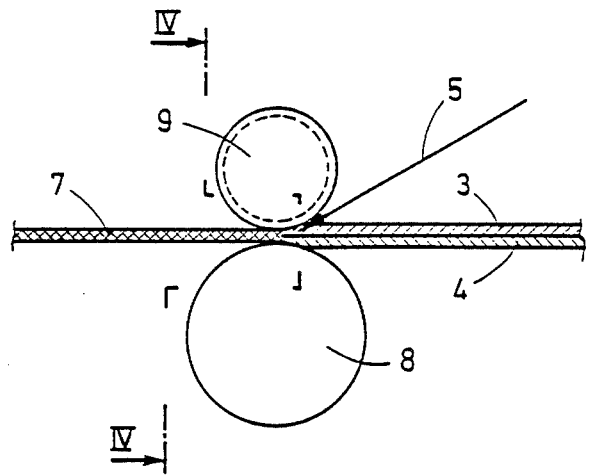
FIG. 3 is a side elevational view in section through the welding region illustrating the compression action.
Figure 4:
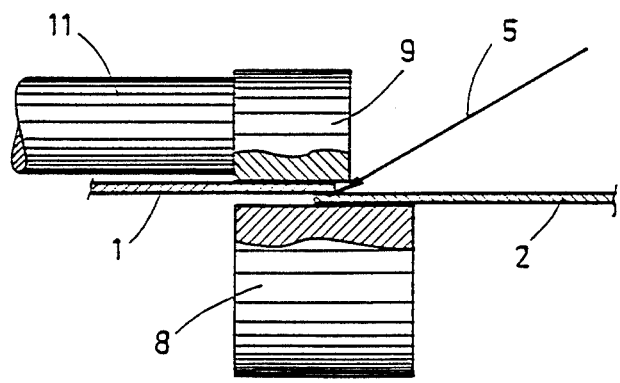
FIG. 4 is a section taken along the line IV—IV of FIG. 3, showing the rolls somewhat diagrammatically and hence without the central tubular conductive or nonconductive portions.
Figure 5:
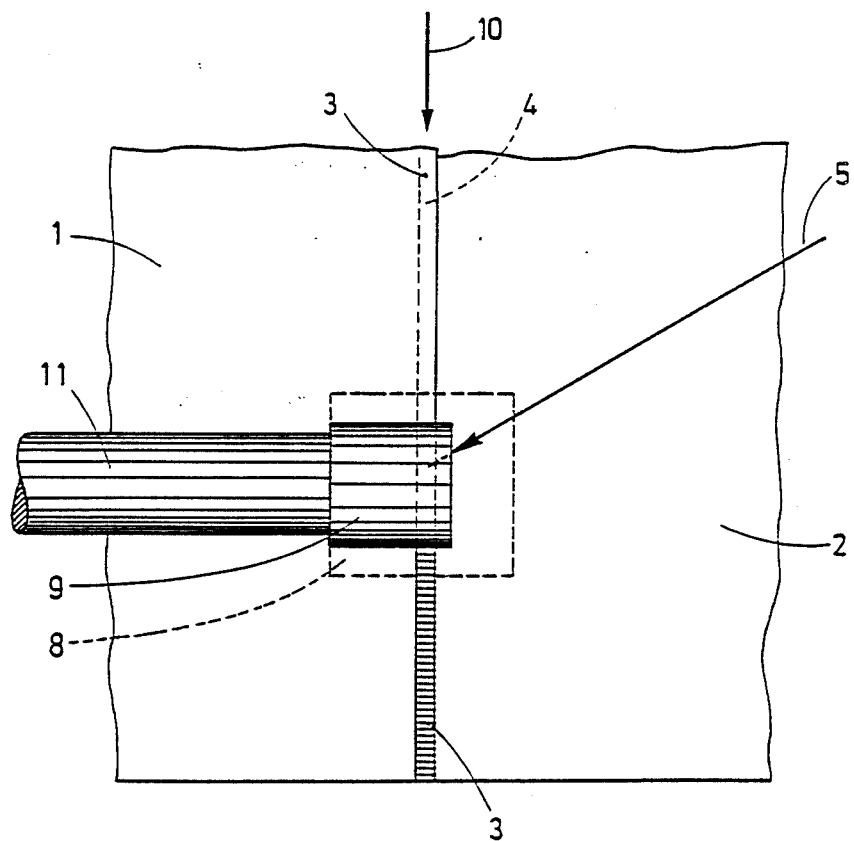

To minimize the distance between the heating point and the compression point, the pressure roll 9 can be of reduced diameter and the laser beam is directed not in a vertical plane parallel to the plane of the axes of the rolls, but with an inclination to this plane and to the plane of the workpieces as has been shown in FIGS. 2 and 3.

To ensure an effective weld seam, it has been found that it is advantageous to cool the rolls or to make at least the outer surface portions thereof of a metal having high thermal conductivity.

The cooling can be effected by, for example, a coolant passage 20 within the rolls or by a direct coolant at 21 onto the rolls from a coolant supply source 22 which can control the temperature of the coolant to maintain, in combination with heating capacity of the rolls, the desired roll temperature on contact with the heated overlap regions.

Especially with extremely fine sheet metal, a heating of the rolls may be required in the weld regions and this is accomplished by heating the medium which is used and/or by thermal insulation of the outer periphery of the roll to prevent loss of heat therefrom. This can be accomplished by the use of a ceramic central portion of the roll or by constituting the roll of a ceramic mass.

The weld process has been schematically illustrated in FIG. 3 in which the base roll 8 and the pressure roll 9 are seen in end view and define a nip having a width substantially equal to the thickness b of the sheet metal.

One or both of these rolls may be driven to draw the workpieces through the nip in the direction of the arrows 10 (FIG. 2). At the upstream side, the two edge regions 3 and 4 are shown to be overlapped and at the downstream side are seen to be fused in the joint seam 7. The laser beam 5 is seen to be trained on the upper region 3 although it also can be trained on the lower region beyond the upper region.

Alternatively or in addition, a laser beam can be directed against the underside. The laser beam, of course, must deliver sufficient heat to permit the fusion of the two edge regions and the displacement of the material by the rolls to yield the ultimate joint thickness which is significantly less than twice the thickness of the sheet metal.

It Will be apparent from FIG. 3 that one can thus achieve a reduction to 1.4b or somewhere between 1.3b and 1b or even to 1b.

To prevent the shaft 11 from being excessively stressed, the pressure roll 9 can be braced by one or more backup rolls which can be larger diameters and correspondingly larger diameter shafts.

The base roll 8 and, if desired, the pressure roll 9, can be constituted as massive steel rolls, although in general it will be desirable to provide the aforementioned high conductivity or low conductivity central or tubular portions so that the rolls will have the desired temperature response and can provide thermal insulation or thermal conductivity to achieve the desire ends with respect to the heating at the weld zone.

Of course, the rolls need not be driven and other transport means engageable with the workpieces can be provided, and, of course, such means can be arranged to ensure that the feed of the overlap region through the nip between the rolls will remain linear.

In any case, it will be apparent that the invention provides in a relatively simple manner, an overlap-type seam whose thickness is significantly less than the customary overlap seams with double the sheet metal thickness. The squeezing or pressing of the weld seam although increases its strength and the tightness of the joint so that at relatively low cost, a fatigue-resistant relatively thin weld seam can be obtained which can compensate for edge tolerances and fabrication tolerances in the sheet metal generally.

I claim:

1. A method of welding edge portions of thin sheet metal together, said method comprising the steps of:
    (a) overlapping said edge portions of said thin sheet metal to form an overlap region of the thin sheet metal, said sheet metal having a certain thickness and said overlap region having a width of 0.3 to 8 times said thickness;
    (b) training a laser beam on said overlap region for a period and of an intensity sufficient to heat and raise the temperature locally of said edge portions to a temperature above the melting point of the sheet metal; and
    (c) pressing the heated edge portions together between tools having a spacing less than the sum of the thicknesses of said edge portions to form a seam between said edge portions of a thickness which is equal to said thickness of said sheet metal.

2. The method defined in claim 1 wherein a location at which said region is locally heated in step (b) is progressively advanced along said edge portions and said tools directly follow the progressive advance of said location along said edge portions.

3. The method defined in claim 2 wherein said tools are pressing rolls engaging said region from opposite sides and said edge portions are advanced between said rolls from an upstream side of said rolls to a downstream side thereof, said laser beam being trained on said region immediately upstream of said rolls.

4. The method defined in claim 3 wherein said edge portions are overlapped in step (a) by placing an upper one of said edge portions above a lower one of said edge portions, said laser beam being trained on said upper one of said edge portions.

5. The method defined in claim 4 wherein said upper one of said edge portions has an end flank with a lower portion adjoining said lower one of said edge portions at an angle and said laser beam is trained into said angle and against said lower portion of said flank to limit reflection of said laser beam from said edge portions.

6. An apparatus for welding edge portions of thin sheet metal together, said apparatus comprising:
means including a pair of tools receiving overlapping edge portions of said thin sheet metal forming an overlap region between them and having a spacing less than the sum of the thickness of said edge portions; and
means for training a laser beam on said overlap region for a period and of an intensity sufficient to heat and raise the temperature locally of said edge portions to a temperature above the melting point of the sheet metal whereby the heated edge portions are pressed together to form a seam between said edge portions of a thickness which is substantially less than said sum, said tools being rolls and said overlap region being moved between said rolls in a transport direction from an upstream side of said rolls to a downstream side thereof and said laser beam is trained on said region at said upstream side and at a nip between said rolls at which said region is engaged between said rolls, said rolls being cantilevered to overhang said region at free ends of said rolls, said rolls including a base roll of larger diameter below said overlap region and a pressure roll of smaller diameter located above said overlap region, said means for training said laser beam including a laser generator located above said sheet metal and training said laser beam on an upper one of said edge portions, said upper one of said edge portions having an end flank adjoining a lower one of said edge portions at an angle of said means for training said laser beam and is composed to direct said laser beam into said angle, said overlap region having a width (a) which is substantially 0.3 to 8 times the thickness (b) of the sheet metal.

7. The apparatus defined in claim 6 wherein said overlap region has a width (a) which is substantially 0.5 to 1.5 times the thickness (b) of the sheet metal.

8. The apparatus defined in claim 6 wherein the thickness of said overlap region is reduced, upon forming said seam, to at most 1.6 times said thickness (b) of the sheet metal.

9. The apparatus defined in claim 8 wherein the thickness of said overlap region is reduced, upon forming said seam, to at most 1.3 times said thickness (b) of the sheet metal.

10. The apparatus defined in claim 9 wherein the thickness of said overlap region is reduced, upon forming said seam, to about the thickness (b) of the sheet metal.

11. The apparatus defined in claim 6 wherein said rolls are composed of at least centrally tubular zones of a material of high thermal conductivity selected from the group which consists of copper and aluminum.

12. An apparatus for welding edge portions of thin sheet metal together, said apparatus comprising:
means including a pair of tools receiving overlapping edge portions of said thin sheet metal forming an overlap region between them and having a spacing less than the sum of the thicknesses of said edge portions; and
means for training a laser beam on said overlap region for a period and of an intensity sufficient to heat and raise the temperature locally of said edge portions to a temperature above the melting point of the sheet metal whereby the heated edge portions are pressed together to form a seam between said edge portions of a thickness which is substantially less than said sum, said rolls being composed of at least centrally tubular zones of a material of low thermal conductivity selected from the group which consists of pressed glass and mineral wool, silica and ceramic.

13. The apparatus defined in claim 6 wherein said rolls are provided with means for cooling said rolls.

14. The apparatus defined in claim 13 wherein said means for cooling include passages formed in said rolls and means for passing a coolant through said passages.

15. The apparatus defined in claim 13 wherein said means for cooling include means for directing a coolant onto the respective rolls.

16. The apparatus defined in claim 6, further comprising means for maintaining a predetermined temperature of at least one of said rolls by contacting same with a thermal medium at said predetermined temperature.

* * * * *